(12) United States Patent
Fridd

(10) Patent No.: US 6,752,219 B1
(45) Date of Patent: Jun. 22, 2004

(54) TURF CUTTING AND HANDLING SYSTEM FOR GOLF GREEN CUP

(76) Inventor: Bruce A. Fridd, 304 Outer Dr., Tecumseh, MI (US) 49286

(*) Notice: Subject to any disclaimer, the term of this patent is extended or adjusted under 35 U.S.C. 154(b) by 0 days.

(21) Appl. No.: 10/249,960

(22) Filed: May 22, 2003

(51) Int. Cl.$^7$ ............................................. A01B 45/00
(52) U.S. Cl. ........................ 172/22; 30/278; 30/316; 111/99; 175/20; 73/864.44
(58) Field of Search ............................. 172/21, 22, 25; 175/20; 171/50, 62; 30/DIG. 7, 278, 316; 111/99; 73/864.44, 864.45, 863

(56) References Cited

U.S. PATENT DOCUMENTS

| | | | |
|---|---|---|---|
| 2,057,142 A | * 10/1936 | Fry | 172/22 |
| 2,282,673 A | * 5/1942 | Peterson | 294/50.7 |
| 2,686,690 A | * 8/1954 | Kushnir | 294/50.7 |
| 2,708,593 A | * 5/1955 | Benoist | 294/50.7 |
| 3,375,891 A | * 4/1968 | Murati | 175/403 |
| 3,718,358 A | 2/1973 | Ayers | |
| 3,823,970 A | 7/1974 | Brenner et al. | |
| 3,847,227 A | * 11/1974 | Myers | 172/378 |
| 3,865,055 A | * 2/1975 | Gilbaugh | 111/101 |
| 3,927,720 A | * 12/1975 | Rauch | 172/22 |
| 4,098,360 A | * 7/1978 | Clements | 175/313 |
| 4,106,576 A | * 8/1978 | Clements | 175/313 |
| 4,549,612 A | * 10/1985 | Cushing | 175/20 |
| 4,585,072 A | 4/1986 | Martinez | |
| 4,848,484 A | * 7/1989 | Clements | 175/20 |
| 4,884,638 A | * 12/1989 | Hoffman | 175/22 |
| 4,932,339 A | * 6/1990 | List | 111/106 |
| 4,989,678 A | 2/1991 | Thompson | |
| 5,245,878 A | * 9/1993 | Underwood | 73/864.44 |
| 5,706,904 A | 1/1998 | Turriff et al. | |
| D423,889 S | 5/2000 | Heffner | |
| 6,098,724 A | * 8/2000 | Ricker | 175/20 |
| 6,123,374 A | * 9/2000 | Elder | 294/50 |
| 6,125,948 A | * 10/2000 | David et al. | 175/58 |
| 6,386,294 B1 | 5/2002 | Best | |
| 2003/0037715 A1 | * 2/2003 | Santa Cruz et al. | 111/7.1 |

* cited by examiner

*Primary Examiner*—Thomas B. Will
*Assistant Examiner*—Alexandra K. Pechhold
(74) *Attorney, Agent, or Firm*—Dykema Gossett PLLC; Jerome R. Drouillard

(57) ABSTRACT

A turf cutting and handling system for the borehole of a golf green cup includes a generally cylindrical hollow barrel with a cutting edge disposed about a lower periphery of the barrel. A manually grippable handle allows the barrel to be drilled into a playing surface of the putting green, and an ejection port allows a cut plug of turf and soil to be removed from the cutting barrel after the cut plug has been moved from a cutting position to a removal position by means of an ejector plunger which is engaged with the lower rotationally sheared surface of the soil which is underlying the grassy portion of the cut plug.

14 Claims, 2 Drawing Sheets

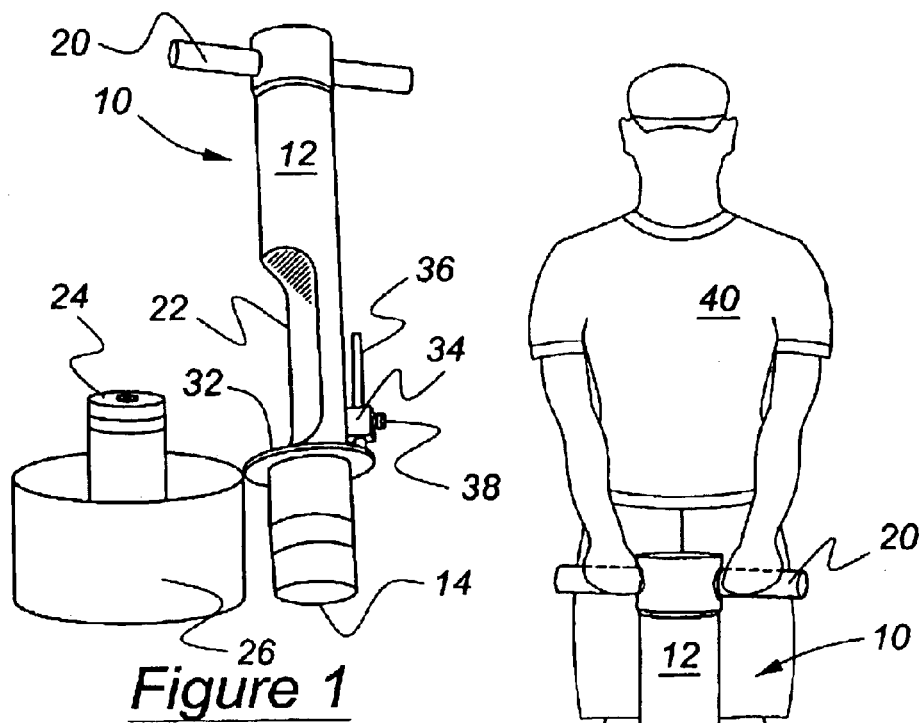
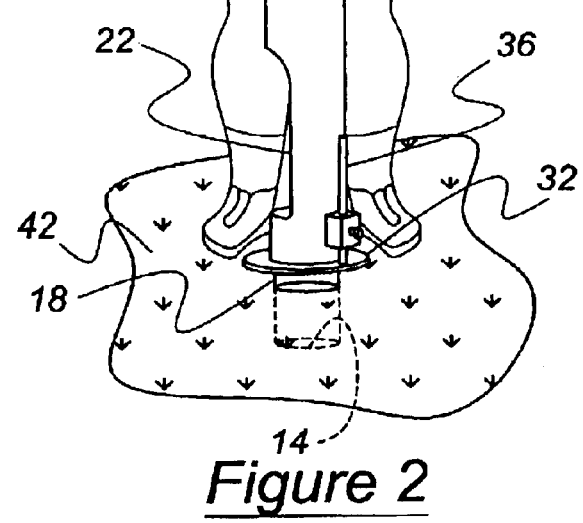

TURF CUTTING AND HANDLING SYSTEM FOR GOLF GREEN CUP

BACKGROUND OF INVENTION

1. Field of the Invention

The present invention relates to a system and method for removing turf and soil to allow the insertion of a putting green cup in a precise and efficient manner.

2. Background of the Invention

For a variety of reasons, the location of golfing green cups must be changed from time to time. When the cup is moved, a cylindrical core of turf and underlying soil must be removed in order to permit the insertion of the plastic cup into the newly bored hole. When the cylindrical core is removed from the putting green surface, it is desirable to avoid spilling dirt on the green surface. It is also desirable and necessary that the hole be bored so that the center line of the boring is perpendicular to all planes of the green's surface. Unfortunately, prior art devices seldom allow these requirements to be met because such devices used linkages which are difficult to actuate and which often destroy the turf plug, littering the surface of the green with cuttings, etc. Moreover, prior art devices are extremely difficult to operate and required high strength to remove the cut plug of turf and underlying soil from the cutting device. This renders such prior art devices inefficient and makes them a potential source of injury to greenskeepers.

The present turf cutting and handling system overcomes the difficulties of prior art devices and allows clean and efficient cutting of golf green cup bores.

SUMMARY OF INVENTION

A turf cutting and handling system for forming a borehole for setting a golf green cup includes a generally cylindrical hollow barrel with a cutting edge disposed about a lower periphery of the barrel, and a manually grippable handle disposed about an upper portion of the barrel. The handle permits the barrel to be rotated by means of the handle and inserted into the turf of a golf playing surface by a greenskeeper. The cutting barrel is adapted to be withdrawn from the turf so as to extract a cylindrical plug of turf from the playing surface. An ejection port disposed in the barrel above the cutting edge and below the handle allows manual removal of the turf plug from the ejection port once the turf plug has been pushed upwardly in the barrel by an ejector plunger. The ejector plunger moves the turf plug from the cut position and into registry with the ejection port.

The barrel preferably tapers from a smaller diameter at the cutting edge to a larger diameter of the ejection port so as to more readily permit movement of the turf plug from the initial cut position to a removal position. The turf cutting and handling system of the present invention further includes a depth controller for limiting the penetration of the barrel downwardly into a turf surface. The depth controller includes a ground contact member for abutting the turf surface which is being cut at such time as the barrel has been inserted to a desired depth. The depth controller further includes a carrier for adjustably clamping the ground contact member to an outer surface of the barrel.

According to another aspect of the present invention, the ejector plunger comprises a closed-end cylinder projecting upwardly from a base. The closed-end ejector plunger may be fastened within a bucket so as to project upwardly from the bottom of the bucket such that grass and soil associated with the turf plug will be prevented from falling on the ground or turf playing surface when the turf plug is removed from the ejection port of the barrel.

According to another aspect of the present invention, a method for cutting a borehole for a golf green cup comprises the steps of manually rotating and driving a hollow cylindrical cutter barrel having a depending a peripheral cutting edge through a turf playing surface and into underlying soil, thereby forming a turf plug having a circular grass upper surface, a cut generally cylindrical circumferential surface, and a rotationally sheared soil lower surface. The present inventive method further includes the steps of manually extracting the cutter loaded with the plug from the playing surface and manually sliding the loaded cutter onto an ejector plunger engaged with the lower surface of the turf plug. The ejector plunger moves the turf plug upwardly in the barrel until the plug is registered with an ejection port disposed in the cylindrical outer wall of the barrel above the cutting edge. This permits easy manual removal of the turf plug from the cutter barrel.

It is an advantage of the present invention that the present system and method allow the cutting of boreholes for golf green cups with precision and without unnecessarily distributing unwanted plant and soil materials upon the putting green's surface.

It is a further advantage of the present invention that the inventive turf cutting and handling system allows putting greens to be managed by individuals having moderate skill and strength levels.

It is a further advantage of the present invention that the inventive turf cutting and handling system does not require the use of expensive and difficult-to-operate linkages and other devices for ejecting a turf plug from a cutter.

Other advantages, as well as features and objects of the present invention, will become apparent to the reader of this specification.

BRIEF DESCRIPTION OF DRAWINGS

FIG. 1 illustrates a turf cutting and handling system according to the present invention.

FIG. 2 illustrates the present cutting and handling system being pressed into the turf and soil of a putting green.

DETAILED DESCRIPTION

Figure 3:
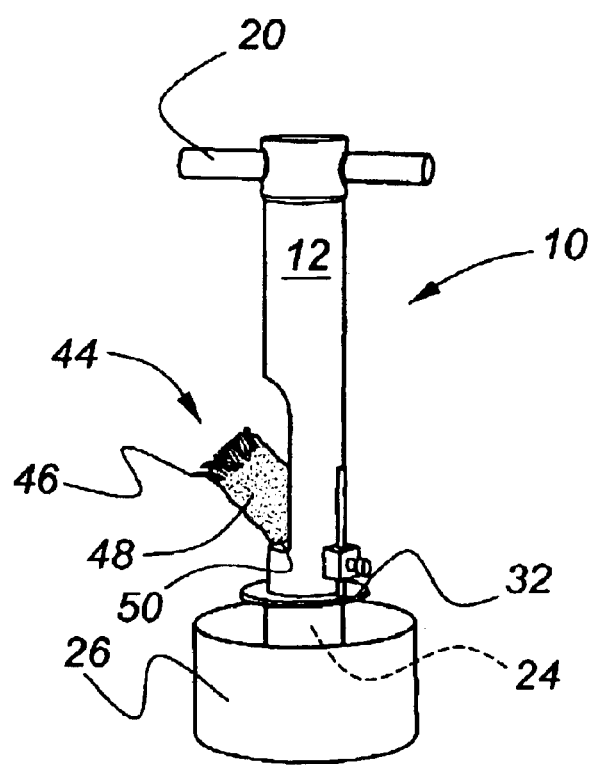
FIG. 3 illustrates a cylindrical cut plug of turf and underlying soil in the ejection port of a cutting barrel according to the present invention.

As shown in FIG. 1, the present turf cutting system includes cutter 10 having a generally cylindrical hollow barrel 12 with cutting edge 14 disposed about the lower periphery of barrel 12. Ejection port 22 is disposed in barrel 12 above cutting edge 14. Ejection port 22 allows a cut plug of turf and underlying soil to be extracted from barrel 12 once the cut plug has been moved upwardly in barrel 12 from the position the turf plug occupies at the conclusion of the cutting operation. The turf plug is pushed upwardly by manually placing cutter 10 upon cylindrical ejector plunger 24. Ejector plunger 24 contacts the bottom end of the cut plug of turf and underlying soil, and when plunger 24 is pushed upwardly into the barrel by a human operator who is pushing downwardly on handle 20 of cutter 10, the turf plug is moved into the vicinity of ejection port 22. Once the turf plug has been moved to ejection port 22, it may easily be removed from cutter 10. Barrel 12 may be constructed of steel or other metallic or non-metallic structural materials such as plastic composites. In any case, cutting edge 14, which depends from barrel 12, will be preferably be formed from a metal such as steel or another metallic or non-metallic material having the properties needed for a digging apparatus of this type.

FIG. 2 illustrates human operator 40, in this case, a greeenskeeper, manually rotating and drilling or driving cutter barrel 12 into grass surface 42 of a putting green to form borehole 18. In essence, barrel 12 is generally rotated more or less than one revolution in either direction, and the rotation is then reversed to produce a screw-like penetration of the grassy upper surface of the green and underlying soil. After the desired depth of cut is reached, further rotation of barrel 12 causes the soil underlying the grassy portion of the turf plug to rotationally shear proximate the lower portion of cutting edge 14, thus forming the lower circular surface of the cut turf plug.

The operator may continue to drive barrel 12 into grassy surface 42 until annular ring 32, which is shown in the various figures, contacts grassy surface 42. Annular ring 32 assists in not only determining the proper depth of cut for barrel 12, but also assists operator 40 in making the cut so that the central axis of the bored turf plug is vertical. This vertical relationship will be aided if a bullseye level (not shown) is mounted upon an upper surface of barrel 12 in conventional fashion. The position of annular ring 32 is adjustable by means of adjusting rod 36 which is held within bracket 34 by means of pinch bolt 38.

FIG. 3 illustrates cut turf plug 44 in the removal position. Note that in FIG. 3, turf plug 44 includes a circular grass upper surface 46 and underlying soil portion 48 having a cylindrical outer surface and a rotationally sheared lower surface 50.

FIG. 3 also illustrates that ejection plunger 24 is mounted within container 26, illustrated as a bucket, which serves to prevent plant and soil materials from falling upon the putting green surface, thereby soiling the playing surface. In this manner, the present invention allows putting green cups to be relocated easily, with precision, and by operators having only a moderate level of training. As a further convenience, ejection plunger 24 may be molded integrally with bucket 26, so as to produce a lightweight yet durable ejector mechanism.

The present invention further includes a method for cutting a borehole for a golf green cup, with the method including the steps of rotating and driving barrel 12 into the playing surface, and then placing the barrel loaded with cut turf plug 44 upon ejector plunger 24, and then pressing barrel 12 down on ejector plunger 24 so as to move cut plug 44 upwardly in barrel 12 until plug 44 is in registry with ejection port 22. According to another aspect of the present invention, barrel 12 is tapered such that the diameter of barrel 12 at the location of ejector port 22 is greater than the diameter of barrel 12 in the location of cutting edge 14. This taper allows cut plug 44 to more easily be moved axially within barrel 12 from the initial cutting position to the position which plug 44 is in registry with ejection port 22.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A turf cutting and handling system for forming a borehole for setting a golf green cup, comprising:

a generally cylindrical hollow barrel with a cutting edge disposed about a lower periphery of the barrel;

a manually grippable handle disposed about an upper portion of said barrel, so as to permit said barrel to be rotated by means of said handle and inserted into the turf of a golf playing surface by a human operator, with the cutting barrel being adapted to be withdrawn from the turf so as to extract a cylindrical plug of turf;

an ejection port, disposed in said barrel above said cutting edge and below said handle; and an ejector plunger for pushing the plug of turf extracted by the barrel upwardly in the barrel from a cut position and into registry with said ejection port, thereby permitting manual removal of the turf plug from the ejection port.

2. A turf cutting and handling system according to claim 1, wherein said barrel tapers from a smaller diameter at said cutting edge to a larger diameter at said ejection port, so as to more readily permit movement of the turf plug from the initial cut position to a removal position.

3. A turf cutting and handling system according to claim 1, further comprising a depth controller for limiting the penetration of said barrel downwardly into a turf surface, with said depth controller comprising a ground contact member for abutting the turf surface which is being cut when the barrel has been inserted to a desired depth, and a carrier for adjustably clamping said ground contact member to an outer surface of said barrel.

4. A turf cutting and handling system according to claim 1, wherein said ejector plunger comprises a closed-end cylinder projecting upwardly from a base.

5. A turf cutting and handling system according to claim 1, wherein said ejector plunger comprises a closed-end cylinder mounted to and projecting upwardly from a ground-contacting container such that grass and soil associated with the turf plug will fall into the container when the turf plug is removed from the ejection port of the barrel.

6. A turf cutting and handling system according to claim 1, wherein said ejector plunger comprises a closed-end cylinder molded integrally with a bucket.

7. A method for cutting a borehole for a golf green cup, comprising the steps of:

manually rotating and driving a hollow cylindrical cutter barrel, having a depending peripheral cutting edge, through a turf playing surface and into underlying soil, thereby forming a turf plug having a circular grass upper surface, a cut generally cylindrical circumferential surface, and a rotationally sheared soil lower surface;

manually extracting the cutter loaded with said plug from the playing surface;

manually sliding the loaded cutter onto an ejection plunger engaged with the lower surface of said turf plug, so as to move the turf plug upward in the barrel until the plug is registered with an ejection port disposed in the cylindrical outer wall of said barrel above said cutting edge; and manually removing the turf plug from the ejection port.

8. A method according to claim 7, wherein said cutter barrel is rotated and pressed into the turf and underlying soil until an adjustable depth controller is in contact with the upper surface of the turf which is being cut.

9. A method according to claim 7, further comprising the step of collecting loose plant material and soil within a container surrounding a lower portion of said ejection plunger, when said turf plug is removed from said ejection port.

10. A turf cutting and handling system for forming a borehole for setting a golf green cup, comprising:
- a generally cylindrical hollow barrel with a cutting edge disposed about a lower periphery of the barrel;
- a manually grippable handle disposed about an upper portion of said barrel, so as to permit said barrel to be reversibly rotated by means of said handle and inserted into the turf and underlying soil of a golf playing surface by a human operator, so as to form a cylindrical turf plug of grass having a grassy end and a rotationally sheared soil end, with the cutting barrel then being withdrawn from the turf so as to extract the turf plug from the playing surface;
- a depth controller for governing the penetration of the barrel into the playing surface;
- an ejection port, disposed in said barrel above said cutting edge and below said handle; and
- a closed-end cylindrical ejector plunger for pushing the plug of turf extracted by the barrel upwardly in the barrel from a cut position and into registry with said ejection port, thereby permitting manual removal of the turf plug from the ejection port.

11. A turf cutting and handling system according to claim 10, wherein said barrel tapers from a smaller diameter at the location of said cutting edge to a larger diameter at the location of said ejection port, so as to more readily permit movement of the turf plug from the initial cut position to the removal position.

12. A turf cutting and handling system according to claim 10, wherein said ejector plunger projects upwardly from the bottom of a bucket such that grass and soil associated with the turf plug will be prevented from falling on the surface of a green when the turf plug is manually removed from the ejection port.

13. A turf cutting and handling system according to claim 10, wherein said hollow barrel comprises a steel tube.

14. A turf cutting and handling system according to claim 10, wherein said hollow barrel comprises a composite tube having a steel cutting edge depending therefrom.

* * * * *